United States Patent [19]

Nakaniwa

[11] Patent Number: 5,058,551
[45] Date of Patent: Oct. 22, 1991

[54] SYSTEM FOR IDENTIFYING MISFIRE CYLINDER IN INTERNAL COMBUSTION ENGINE

[75] Inventor: Shinpei Nakaniwa, Gunma, Japan

[73] Assignee: Japan Electronic Control Systems Company, Limited, Isezaki, Japan

[21] Appl. No.: 602,775

[22] Filed: Oct. 24, 1990

[51] Int. Cl.5 .............................................. F02P 5/14
[52] U.S. Cl. .................................. 123/425; 123/479; 123/435
[58] Field of Search ............... 123/479, 425, 435, 478, 123/480, 198 D, 198 DB; 73/119 A; 364/431.09, 431.11

[56] References Cited

U.S. PATENT DOCUMENTS 4,928,228 5/1990 Fujimoto et al. ............... 364/431.09
4,930,481 6/1990 Fujimoto et al. ................... 123/481
4,945,879 8/1990 Fujimoto et al. ................... 123/479
4,971,010 11/1990 Iwata ................................. 123/435

Primary Examiner—Raymond A. Nelli
Attorney, Agent, or Firm—Foley & Lardner

[57] ABSTRACT

A system for identifying a misfired cylinder of a multiple cylinder internal combustion engine is provided. The system comprises a sensor which monitors revolutional cycles of cylinders respectively to determine a parameter associated with a variation in an average effective pressure of the cylinder in a preselected relation to the revolutional cycles. When the parameter is less than a preselected level, the system corrects the parameter by a correction factor to provide a second parameter in order to prevent reduction in the average effective pressure due to wavering of engine speed after misfire occurs from causing erroneously detection of the misfire cylinder. The system then compares the second parameter with a slice level to detect occurrence of misfire and identifies the misfired cylinder.

13 Claims, 10 Drawing Sheets

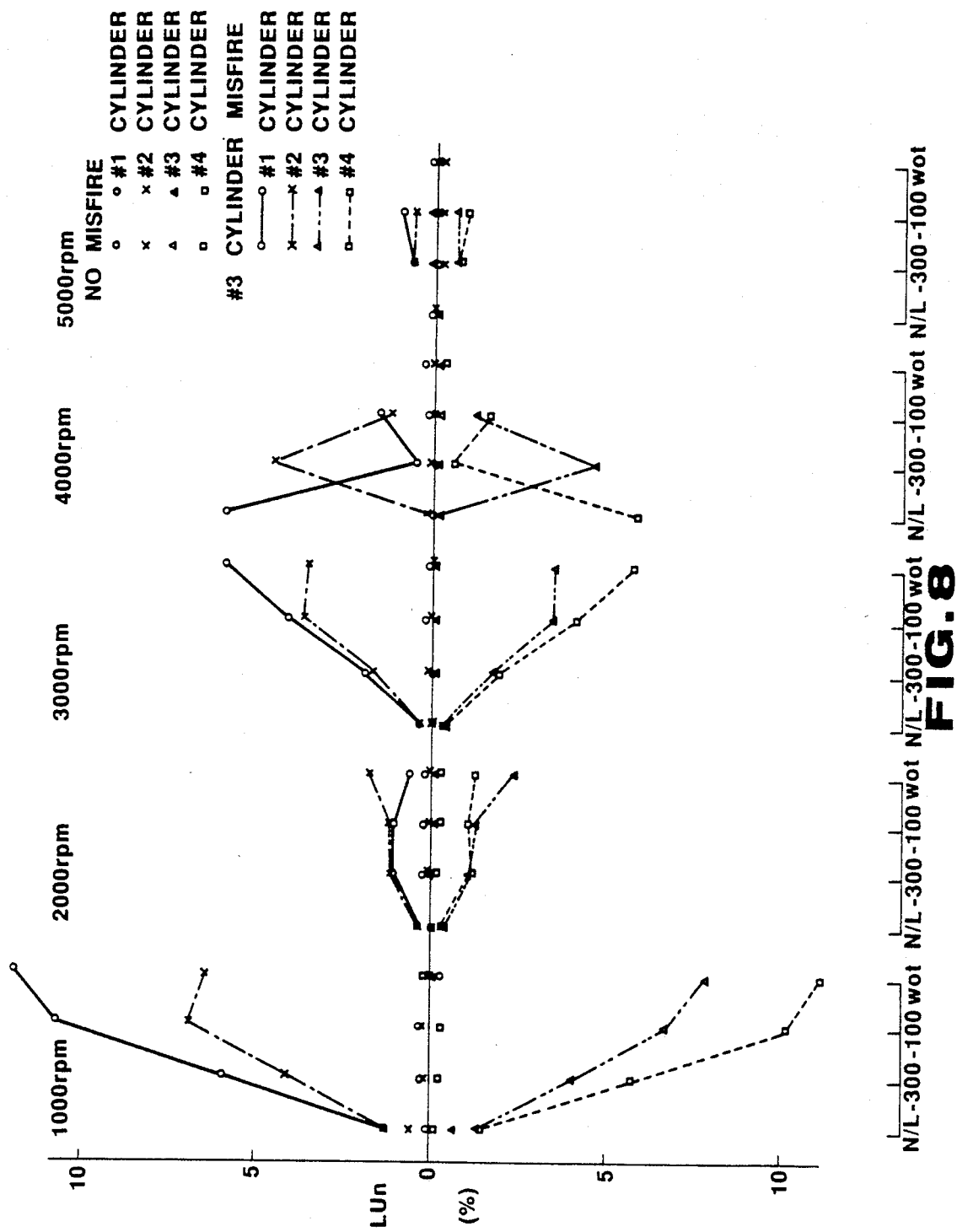

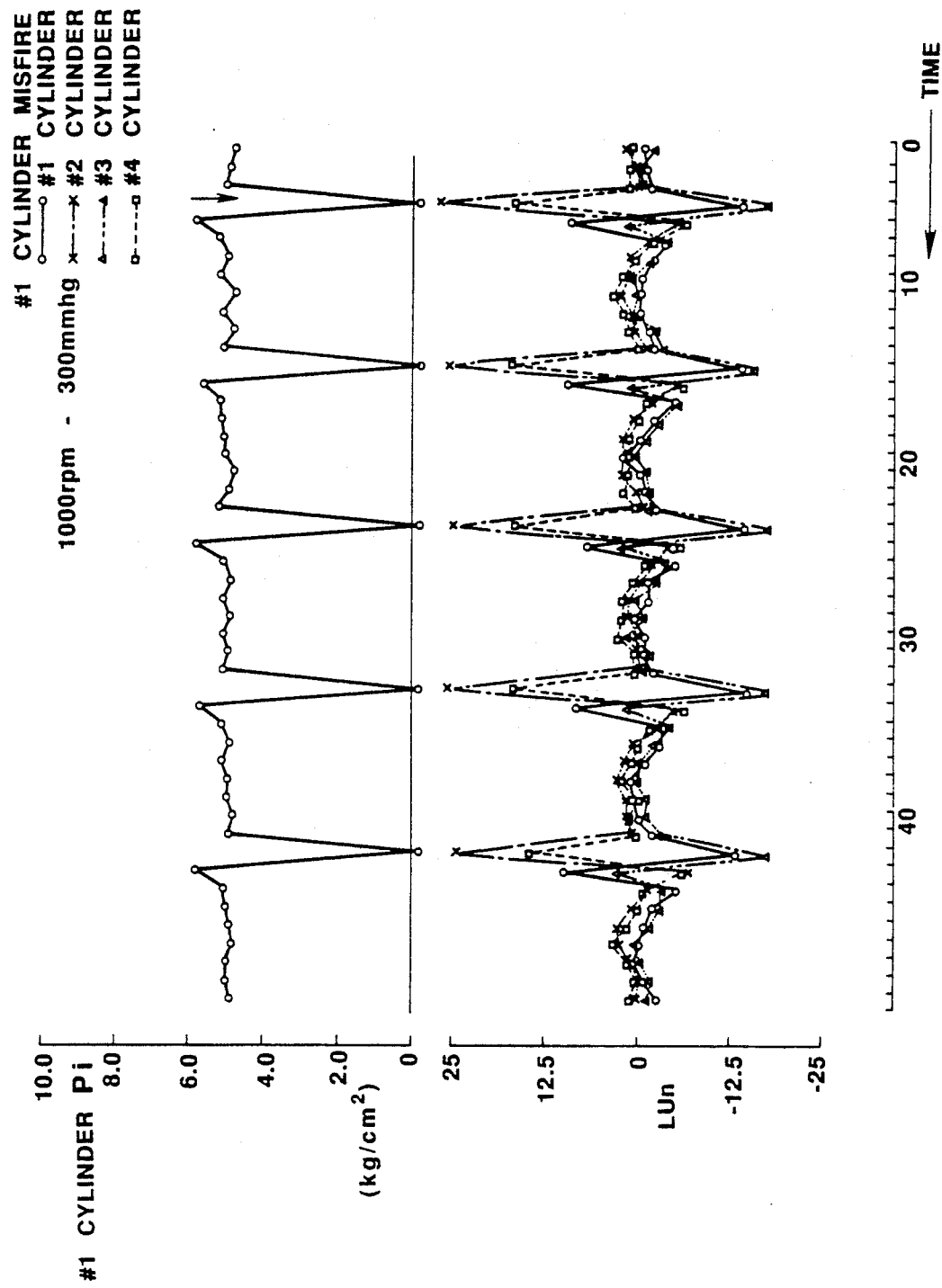

SYSTEM FOR IDENTIFYING MISFIRE CYLINDER IN INTERNAL COMBUSTION ENGINE

BACKGROUND OF THE INVENTION

1. Technical Field

The present invention relates generally to a system for monitoring an engine operating condition to determine cylinders which misfire. More particularly, the invention relates to a system for identifying misfire cylinders based on engine speed cycle.

2. Background Art

In an internal combustion engine, misfires sometimes occur due to malfunctions in an ignition system or a fuel supply system such as a fuel injection valve or leakage of pressurized mixture for example.

When the misfiring occurs, unfired fuel in a misfired cyclinder is discharged to an exhaust system. This unfired fuel is then fired in a catalytic converter, causing damage to the catalytic converter. This damage to the catalytic converter causes exhaust emission control to be degraded, thereby increasing a concentration of harmful emissions.

Therefore, it is necessary to monitor misfire to warn of misfiring or to execute fuel-cut control which is operable to cut fuel to be supplied to the misfired cylinder.

As such, an ISATA-paper "Experiences with a new method for measuring the engine roughness" by R. Latsch, E. Mausner, V. Bianchi, 1979 discloses a system for detecting a misfired cylinder based on engine speed variation. This system mathematically calculates a value LUn representative of engine roughness to determine a misfired cylinder based thereon. The engine roughness value LUn is derived by the following equations.

$$M = W = \theta \frac{dw}{dt}$$

$$M - W = \theta 2\pi \frac{d(1/T)}{dt}$$

$$M - W = \theta 2\pi \frac{d(1/T)}{d\xi} \times \frac{d\xi}{dt}$$

Integrating the above equation with respect to one rotation of a crank shaft, the following equation is obtained.

$$\int_{(j-1)\pi}^{j2\pi} (M - W) \, d\xi = 2\pi^2 \theta \, (1/T_j^2 - 1/T_{j-1}^2)$$

where M=engine output torque, W=load torque, $\omega$=crank angular velocity, $\theta$=inertia moment, t=time, T=a crank shaft rotational cycle value, $\xi$=a crank angle, j=0, 1, 3, ..., Tj=2 or 1 crank shaft rotational cycle, and Tj−1=Tj one cycle before.

Assuming that W is a constant and Tj=Tj−1=Tj−2, the following equation is obtained.

$$\Delta \int_{(j-1)\pi}^{j2\pi} M d\xi = - 4\pi^2 \theta \frac{\Delta(\Delta T_j)}{T_j^3}$$

Since the left term of the above equation corresponds to a variation $\Delta P_i$ of average effective pressure of the engine which closely relates to generation of misfire, calculation of the right term in relation to the crank shaft rotational cycle enables indirect monitoring of variation of the average effective pressure, thereby identifying a misfired cylinder. Thus, the misfire can be detected by determining as to whether the average effective pressure varies to decrease less than a preselected level or not.

An equation of the engine roughness LUn corresponding to the variation $\Delta P_i$ of the average effective pressure Pi is given by the following relation.

$$LUn = -4\pi^2 \theta \frac{\Delta(\Delta T_j)}{T_j^3}$$

The above equation may be simplified in order to calculate practically as follows.

$$\Delta(\Delta T_j) = (T_{j-1} - T_{j-2}) - (T_j - T_{j-1})$$

where in a case of a four-cylinder engine, Tj−1=a cycle 180° before 360° (one revolution), Tj−2=a 180° cycle before 720° (two revolutions), Tj=the most recent 180° cycle and $T_j^3$ is replaced with Tj, Tj−1, or Tj−2 in order to simplify calculation of $T_j^3$.

Assuming that the cycle 180° before 360° (one revolution of the engine) is denoted by a symbol "half", the 180° cycle before 720° (two revolutions) is a symbol "old", the most recent 180° cycle is denoted by a symbol "new" and the $T_j^3$ is replaced with Tj−2 (a 180° cycle before 720°=old), the equation of the engine roughness LUn is simplified as follows.

$$LUn = \frac{(\text{half} - \text{old}) - (\text{new} - \text{half})}{\text{old}}$$

If the engine roughness LUn is determined according to the above equation, for example, a time chart as shown in FIG. 5 is obtained. In this time chart, a value LU1 corresponding to a #1cyclinder of the four-cylinder engine is calculated by assigning the newest 180° cycle, a 180° cycle, one revolution before, affected by a cylinder pressure of the 4cylinder, and a 180° one cycle before affected by a cylinder pressure of the 1cylinder to "new", "half", and "old" when the newest value updated every TDC (180°) is affected by a cylinder pressure of the #1cylinder.

Detection of a misfired cylinder according to the calculation of the value LUn is accomplished with logic wherein if the value LUn is less than a slice level SL determined by engine operating condition such as an engine speed and a basic injection quantity, it is concluded that misfire occurs or if the values LUn are continuously less than the slice level SL, it is concluded that the initial value LUn is affected by the misfire. If the misfire, as shown in FIG. 5, continuously occurs in the #1cylinder, the values LU1 and LU3 respectively corresponding to the #1 and #3cylinders are negative values less than the slice level SL. It is however concluded that the misfire occurs in the #1cylinder since the value LU1 corresponding to the #1cylinder is the initial value.

The slice level SL is memorized in a map or table so that it is set to a value intermediate a minimum value LUn when no misfire occurs in all cylinders and a minimum value when misfire occurs in any cylinder to ensure accuracy of the misfire detection relative to variation in the value LUn due to various engine operating condition (See FIGS. 6 to 8).

The misfire detection based on the above described engine roughness value LUn can provide proper detection accuracy when misfire occurs continuously in a particular cylinder. However, if one misfire occurs, as shown in FIG. 9, in a particular cylinder discontinuously, a wavering of normal engine combustion occurs after each misfire. Due to this wavering in the engine revolution, the engine roughness value LUn sometimes becomes a negative value over the slice level SL. This results in mis-detection wherein it is concluded that misfire occurs in a cylinder other than a misfired cylinder.

For example, as shown in FIG. 9, if one misfire occurs in only #1cylinder every nine engine revolutions, while both a value LU1 of the #1cylinder and a value LU3 of the #3cylinders are negative values less than the slice level SL because cylinders are ignited in order of #1, #3, #4, and #2, it is concluded that the misfire occurs in the #1cylinder since the value LU1 of the #1cylinder is an initial value. However, if the misfire occurs discontinuously in the #1cylinder, engine speed varies after normal combustion occurs in the #1cylinder resulting in wavering revolution. This causes values LU2 and LU3 becomes negative values less than the slice level SL. As a result, an error is made in conclusion that misfire occurs in the #4cylinder because it is fired earlier than the #2cylinder.

It will be appreciated that the prior art misfire detection system correctly identifies a misfired cylinder when misfire occurs continuously in a particular cylinder, however, accuracy of the misfire detection is reduced when the misfire occurs discontinuously in the particular cylinder.

SUMMARY OF THE INVENTION

It is accordingly one object of the present invention to avoid the disadvantages of the prior art.

It is another object of the invention to provide a system for identifying a misfired cylinder precisely even when misfire occurs discontinuously in a particular cylinder to prevent misfire from being erroneously detected when engine revolution wavers.

According to one aspect of the present invention, there is provided a system for detecting a misfired cylinder of a multiple cylinder internal combustion engine which comprises a sensor means for monitoring variation of an engine operating condition during each engine revolutional cycle to provide a signal indicative thereof, a first means for determining a first parameter associated with a variation in an average effective pressure of the cylinder based on the variation monitored by said sensor means and providing a signal indicative thereof, a second means responsive to the first parameter determined by the first means less than a preselected level which represents reduction in the average effective pressure in the cylinder to correct the first parameter by a preselected correction factor for compensating a factor of variation of engine revolutional speed after misfire occurs to provide a second parameter, and a third means responsive to the second parameter less than a preselected slice level which represents occurrence of misfire for identifying the misfired cylinder.

According to another aspect of the invention, there is provided a system for detecting a misfired cylinder of a multiple cylinder internal combustion engine which comprises a sensor means for monitoring a crank angle to determine cycles between top dead centers to provide signals indicative thereof, a first means for determining a first parameter associated with a variation in an average effective pressure of the cylinder based on the the revolutional cycles monitored by the sensor means and providing a signal indicative thereof, a second means for determining a second parameter selectively, from among the first parameters monitored by the first means in previous operational cycles of the system, which represents a maximum reduction in the average effective pressure, a third means responsive to the first parameter determined by the first means less than a preselected level which represents reduction in the average effective pressure in the cylinder for compensating the first parameter by a correction factor selected by a relation between the first parameter and the second parameter to provide a third parameter, and a third means responsive to the third parameter less than a preselected slice level which represents occurrence of misfire for identifying the misfired cylinder.

According to a further aspect of the invention, there is provided a system for detecting a misfired cylinder of a multiple cylinder internal combustion engine which comprises a sensor means for monitoring revolutional cycles of cylinders respectively to provide signals indicative thereof, a first means for determining a first parameter (LU) associated with a variation in an average effective pressure of the cylinder according to a relation $$LU = \frac{(half - old) - (new - half)}{old}$$

where new denotes an up-to-date revolutional cycle between top dead centers monitored by the sensor means, half denotes a revolutional cycle between top dead centers one stroke cycle before, and old denotes a revolutional cycle between top dead centers two stroke cycles before, and providing a signal indicative thereof, a second means for selecting a second parameter, from among the first parameters (LU) monitored by the first means in previous operational cycles of the system, which represents a maximum reduction in the average effective pressure, a third means responsive to the first parameter (LU) determined by the first means less than a preselected level which represents reduction in the average effective pressure in the cylinder for compensating the first parameter by a correction factor selected by a relation between the first parameter and the second parameter to provide a third parameter, and a third means responsive to the third parameter less than a preselected slice level which represents occurrence of misfire for identifying the misfired cylinder.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

FIGS. 6, 7, 8 and 9 are time-charts which show a relation between misfire and a engine roughness value LUn.

DESCRIPTION OF THE PREFERRED EMBODIMENT

Figure 1:
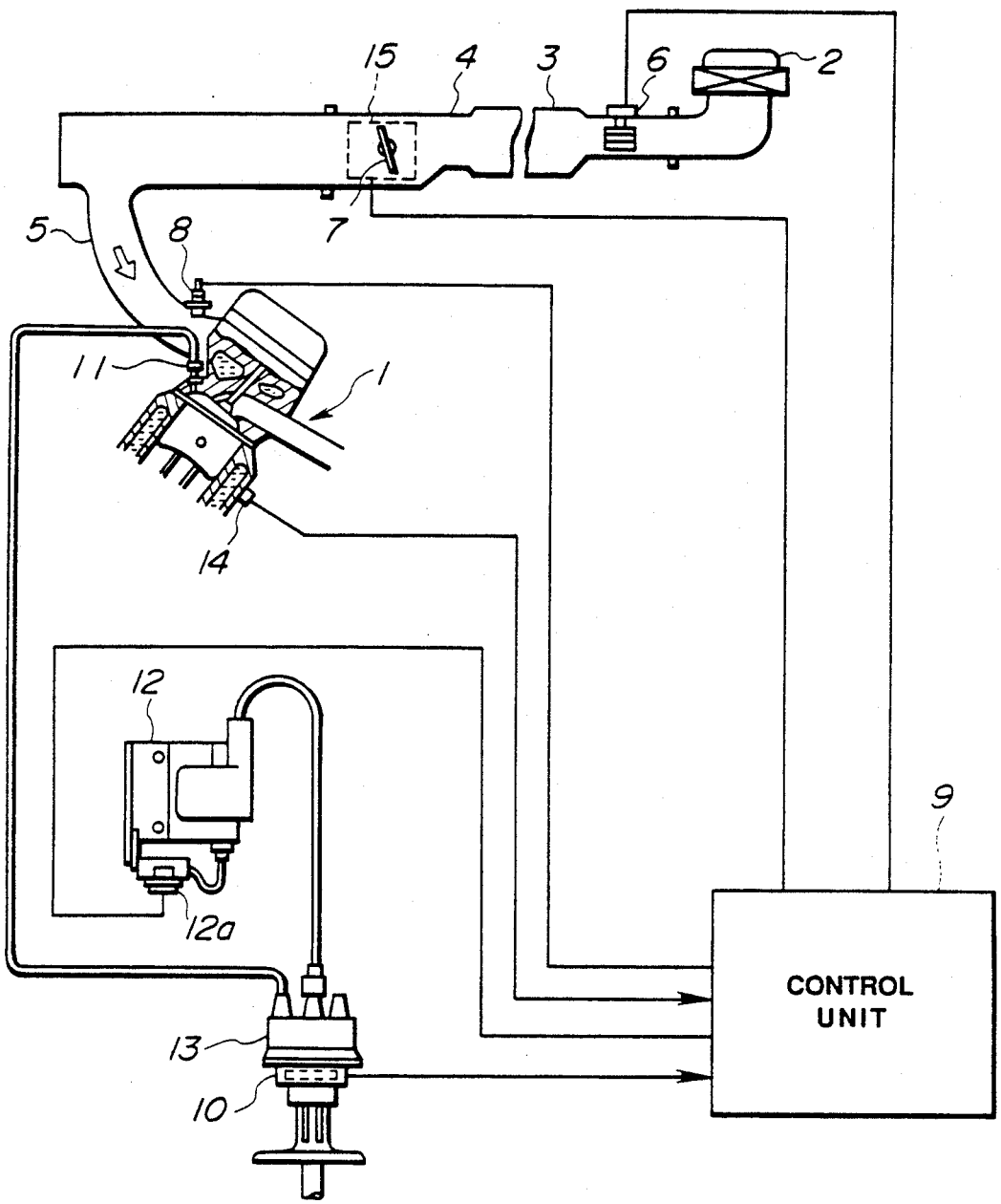
FIG. 1 is a block diagram which shows a system according to the present invention.

Referring now to the drawings, particularly to FIG. 1, a system according to the present invention is shown which monitors misfire of an internal combustion engine.

Air is supplied to the internal combustion engine 1 through an air cleaner 2, an intake duct 3, a throttle chamber 4, and an intake manifold 5. The intake duct 3 includes an air-flow meter 6 which detects an intake air flow rate Q to output a signal indicative thereof to a control unit 9. The throttle chamber 4 includes a throttle valve 7 which is operated by an acceleration pedal (not shown) for controlling the intake air flow rate Q. The intake manifold 5 includes electromagnetic type fuel injection valves 8 (fuel nozzles) for every cylinder (in this embodiment, four cylinders are provided) which inject fuel in the intake manifold supplied by a fuel pump (not shown) under a preselected pressure controlled by a pressure regulator.

The control unit 9 includes a micro-computer which is operable to control the flow rate of fuel or fuel injection quantity. The control unit 9 calculates a basic fuel injection quantity Tp given by a relation of $Tp = K \times Q/N$ (K = a constant) based on the intake air flow rate Q monitored by the air flow meter 6 and engine speed N determined by a signal from a crank angle sensor 10 incorporated in a distributor 13 and then compensates the basic fuel injection quantity Tp based on a coolant temperature Tw detected by a coolant temperature sensor 14 to provide a target fuel injection quantity Ti to output driving pulse signals indicative thereof to the fuel injection valves 8 synchroniously with engine revolutions, thereby injecting necessary quantity of fuel to the engine 8.

The cylinders of the engine 1 include spark plugs 11 respectively to which high-voltage surges produced by ignition coils 12 are applied through the distributor 13 in regular order, thereby generating spark at the spark plugs to ignite a compressed air-fuel mixture. The high-voltage surge generation timing of the ignition coil 12 is controlled by a power transistor 12a. Control of ignition timing (or spark advance control) is accomplished by controlling on-off timing of the power transistor 12a utilizing an ignition control signal from the control unit 9.

The control unit 9 retrieves a correction value ADV for the spark advance which corresponds to driving condition at that time from a map or table which memorizes proper correction values ADV, determined experimentally, for a plurality of engine operating regions respectively which are determined by the basic fuel injection quantity Tp and the engine speed N and detects a cylinder in which misfire occurs to indicate such misfire.

The throttle valve 7 includes a throttle sensor which monitors a throttle valve opening (TVO) utilizing a potentiometer. The crank angle sensor 10 monitors crank angles of the cylinders of four-cylinder engine to provide angle reference signals REF every 180 degrees (in this embodiment, every 70 degrees before and 110 degrees after TDC (Top Dead Center)) and angular position signals POS every 1 or 2 degrees.

Figure 2A:
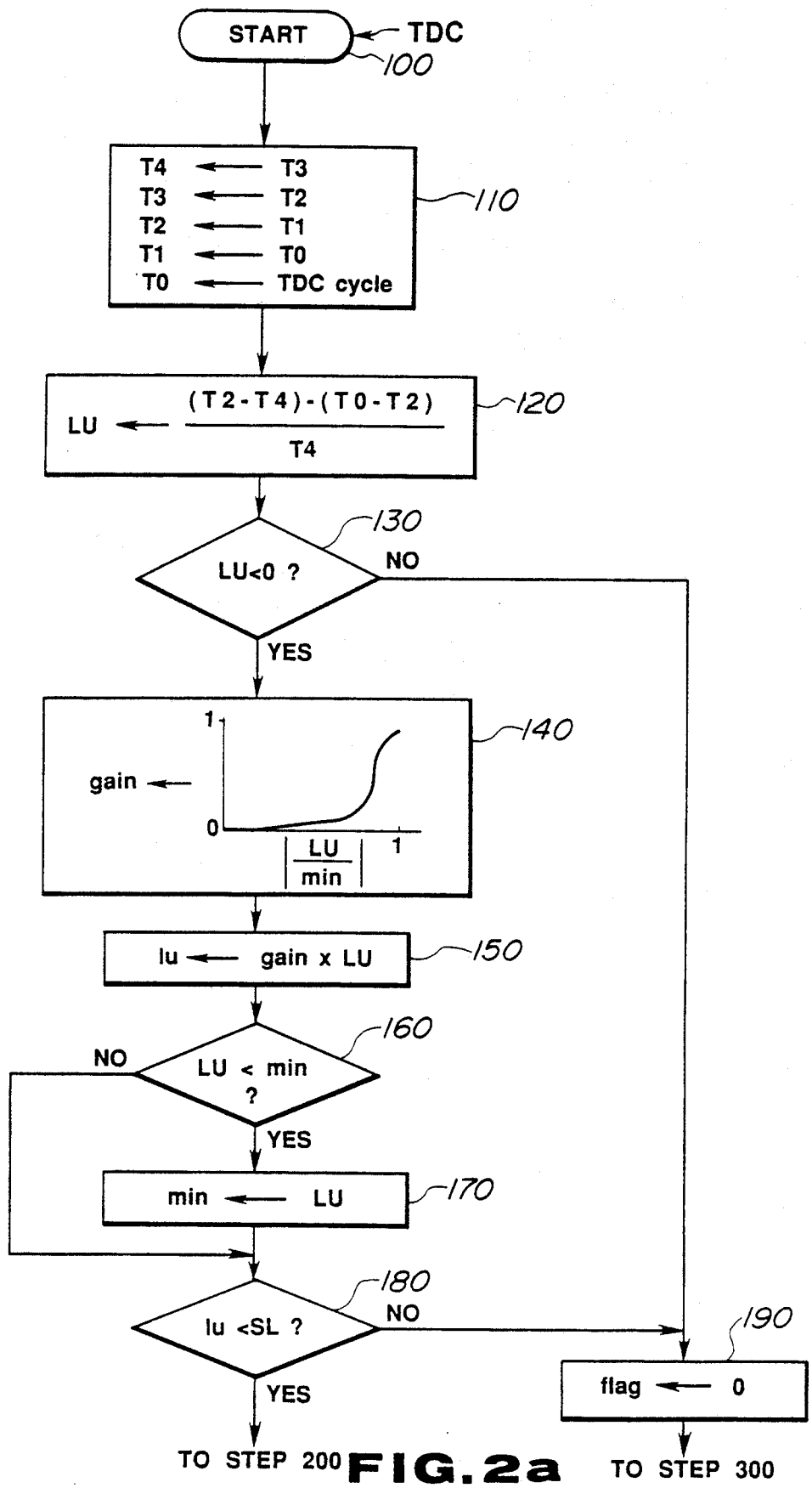
FIGS. 2a, 2b, 2c, 3, and 4 are flowcharts which show programs or sequences of logical steps performed by a system of the invention.
Figure 2B:
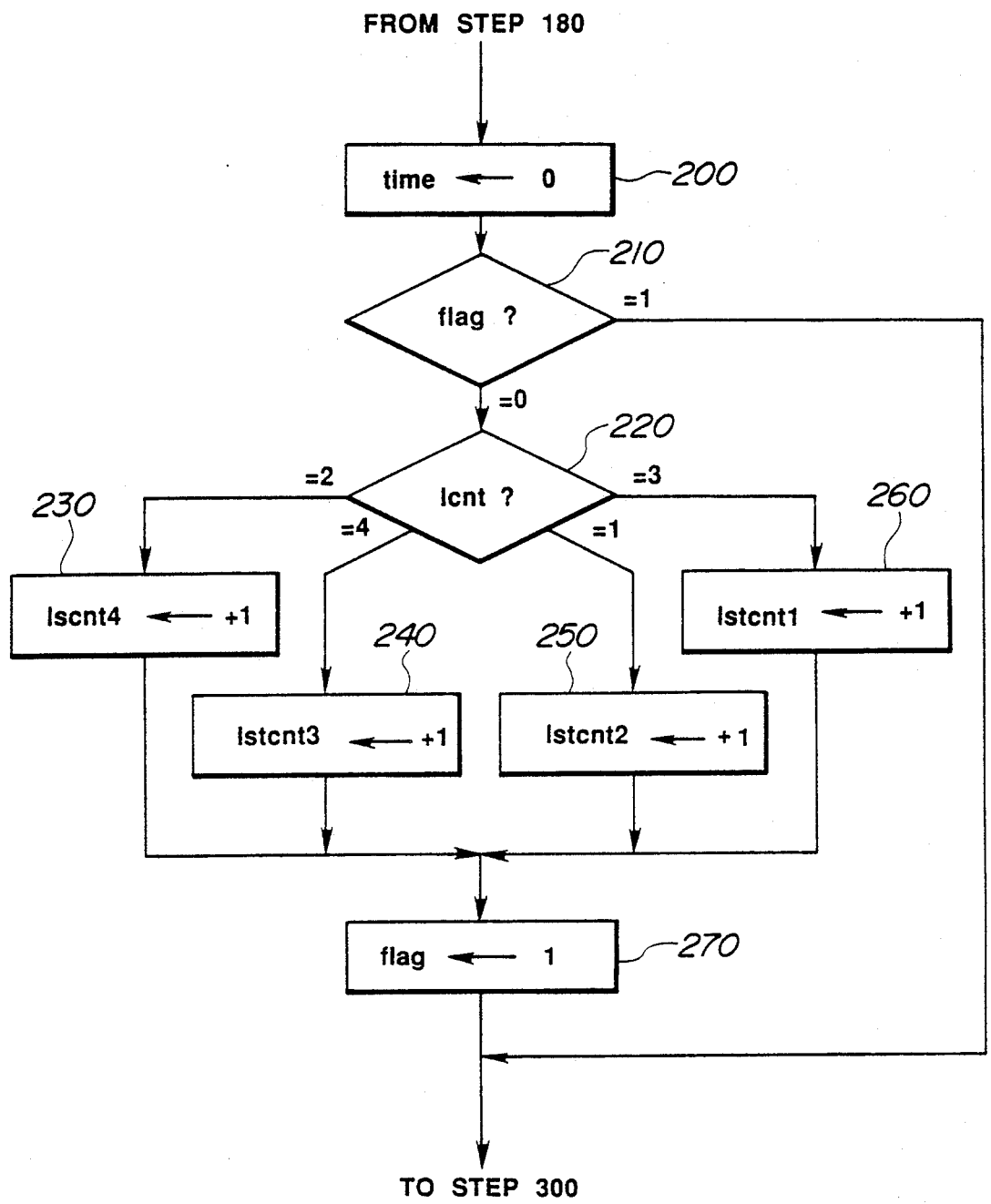
Figure 2C:
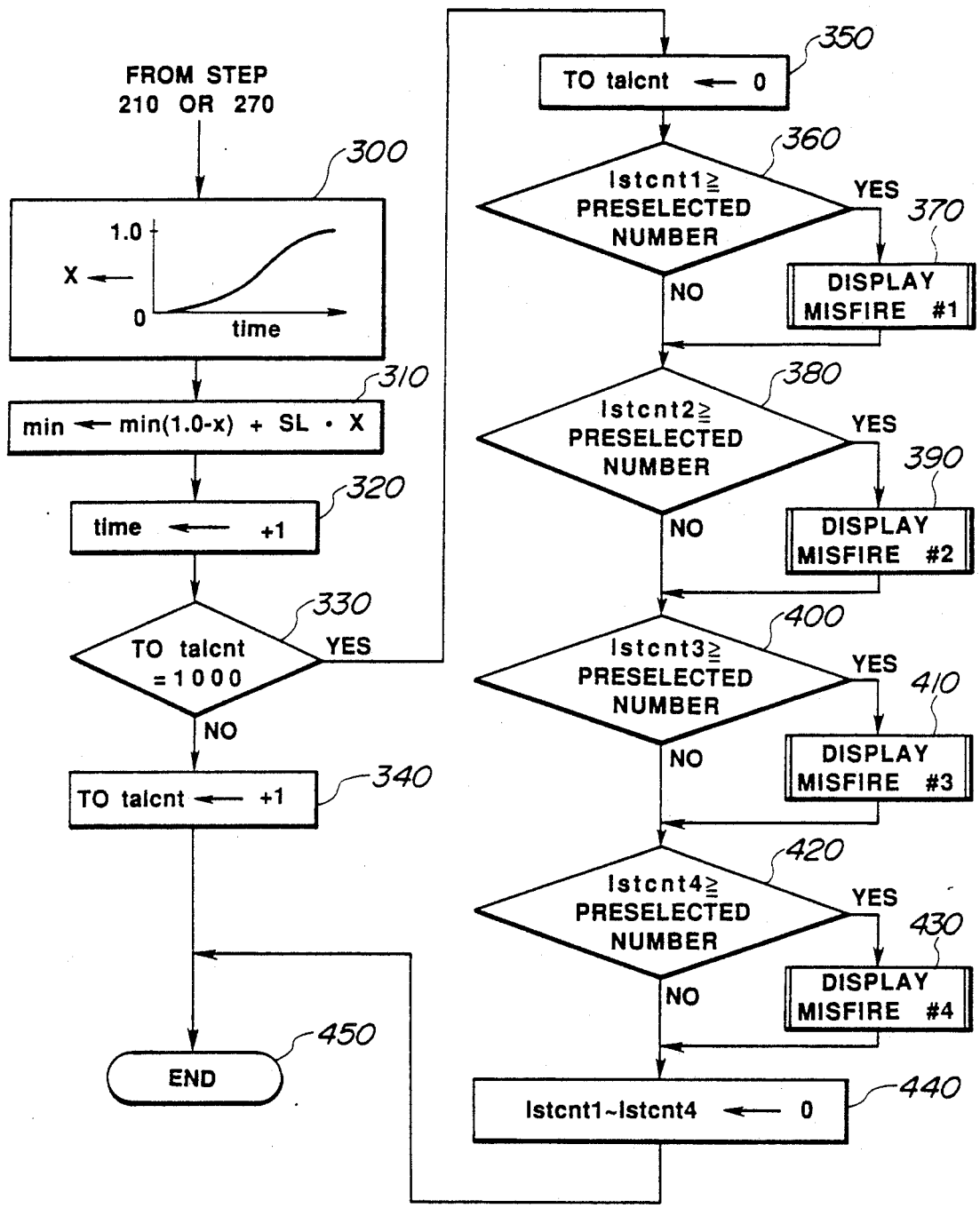
Figure 3:
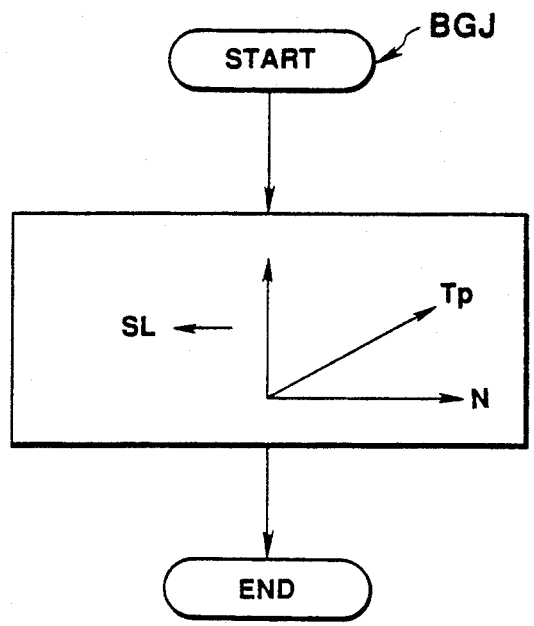
Figure 4:
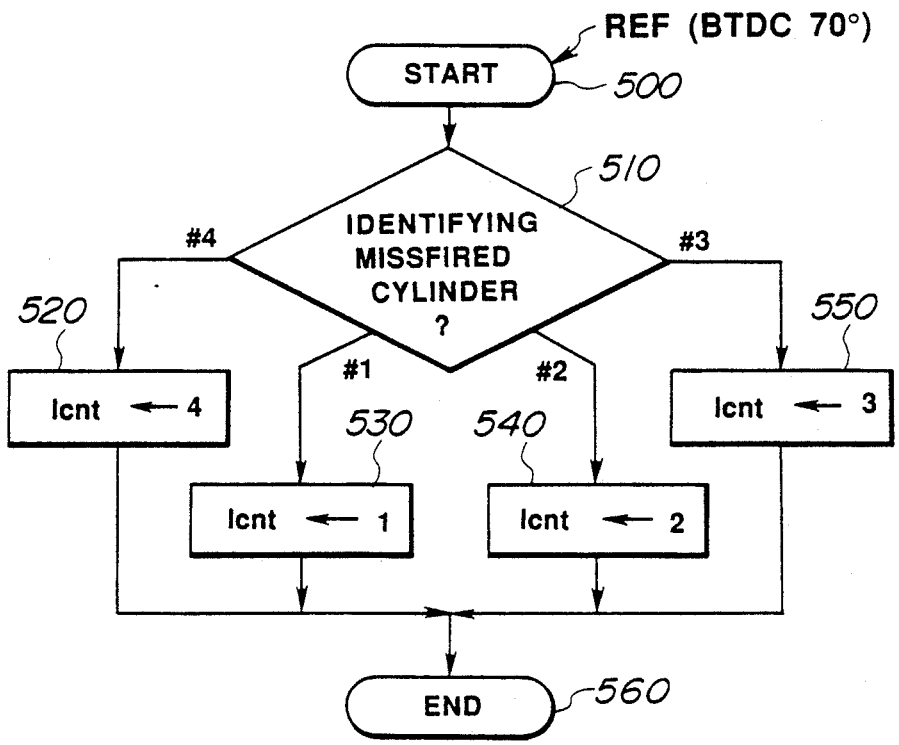

Referring to FIGS. 2 to 4, a flowchart of a program or sequence of logical steps is shown which is performed by the control unit 9 for monitoring misfire to identify the misfired cylinder.

In this embodiment, a four-cylinder engine is used as an example and thus the program is carried out every 180 degrees of engine revolution. The program starts at step 100 every time a cylinder reaches TDC. Monitoring the TDC is accomplished by counting the number of crank angle position signals POS based on the crank angle reference signal REF which is output from the crank angle sensor 10 every 70° before the TDC.

After entering the program in step 100, the routine proceeds to step 110 wherein a 180° revolution cycle (i.e., a TDC cycle) which is a period of time elapsed from the TDC of the previously fired cylinder to the TDC or the currently fired cylinder is determined. An up-to-date TDC cycle T0, a TDC cycle T1 of one program operational cycle before, a TDC cycle T2 two program operational cycles before, and a TDC cycle T3 in three program operational cycles before which are defined in the previous program operational cycle and are updated as T1, T2, T3, and T4 and the current up-to-date TDC cycle is always set to T0.

The routine then proceeds to step 120 wherein an engine roughness value LU (i.e., engine speed variation) which corresponds to a variation in an average effective pressure of each cylinder is mathematically calculated according to the following equation utilizing the updated cycle T0, T2, and T4 derived in step 110.

$$LU = \frac{(T2 - T4) - (T0 - T2)}{T4}$$

Figure 5:
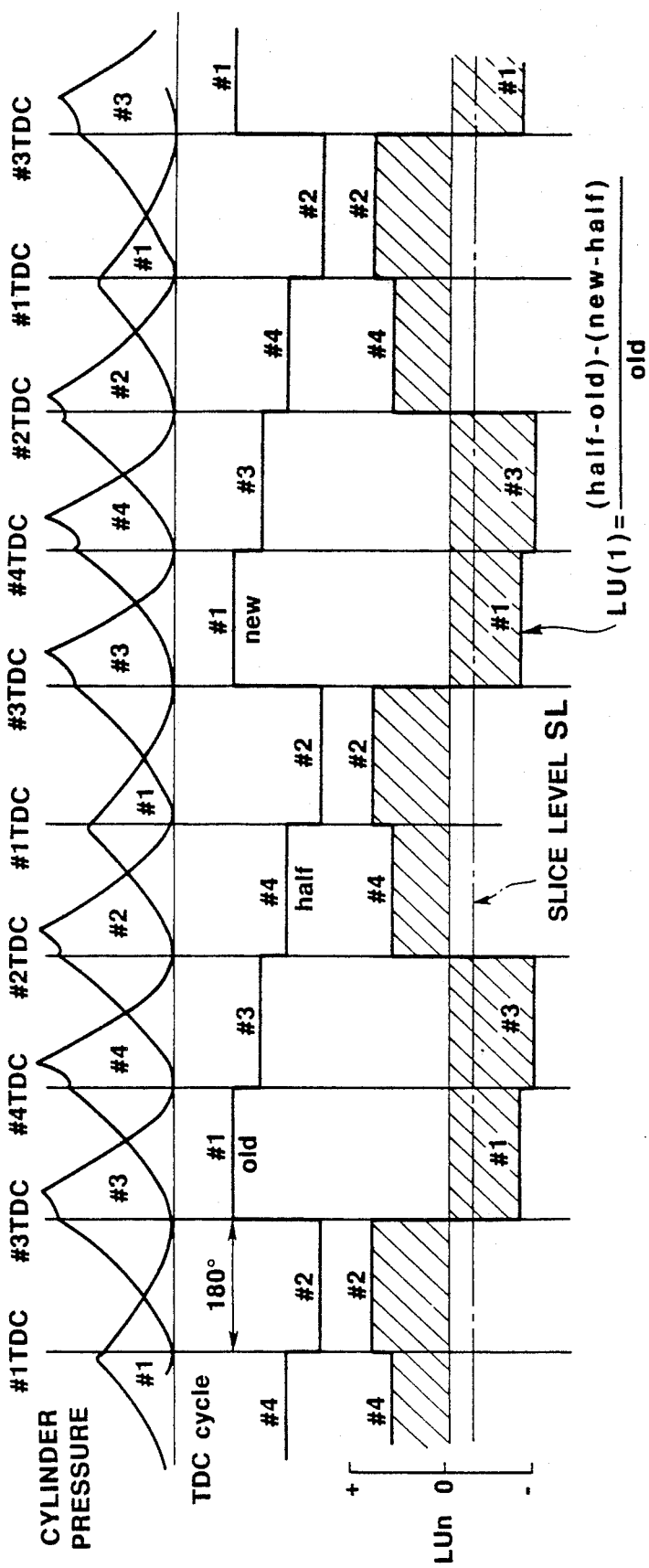
FIG. 5 is a time-chart which shows occurrence of continuous misfire in first and third cylinders.
Figure 6:
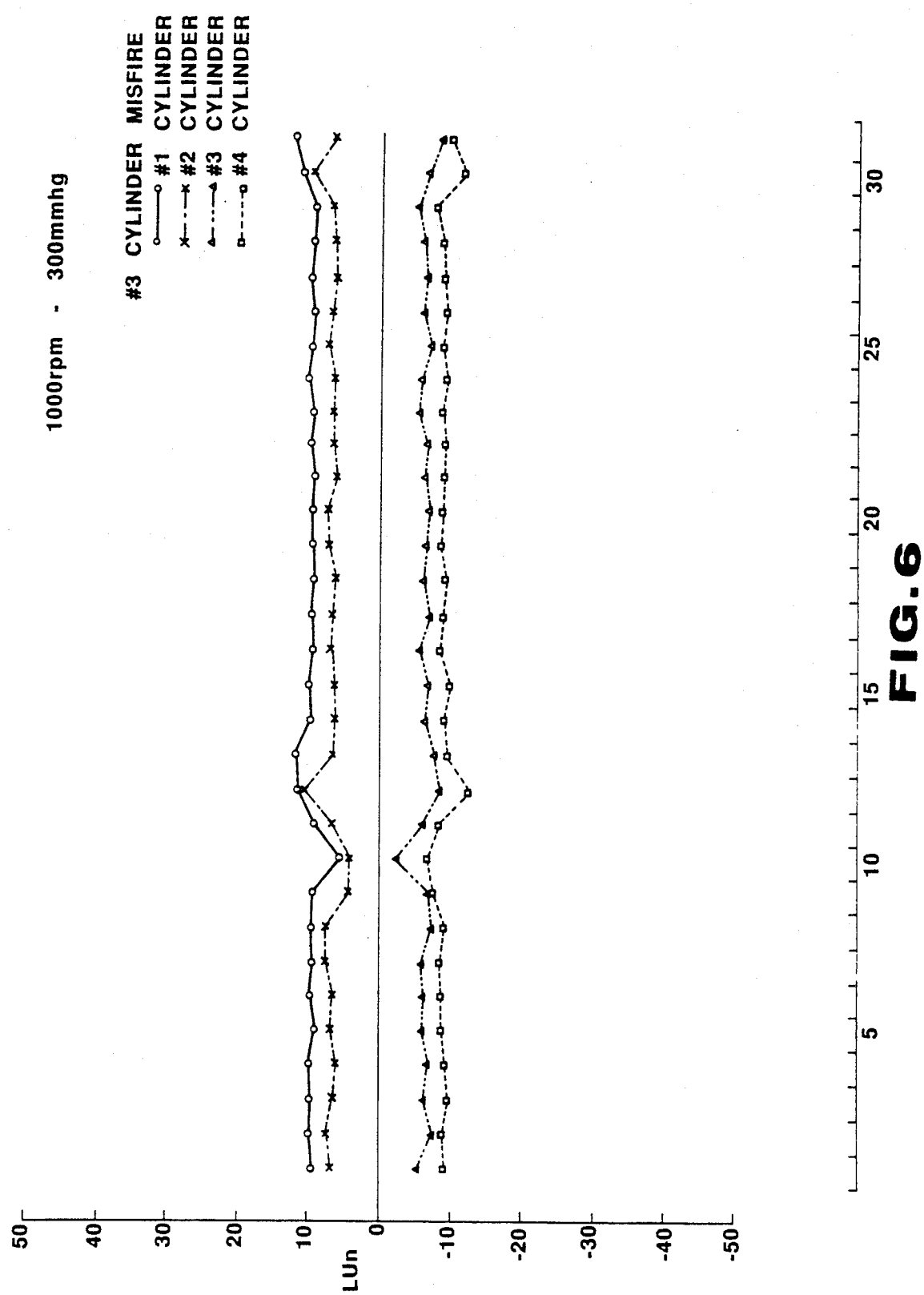
Figure 7:
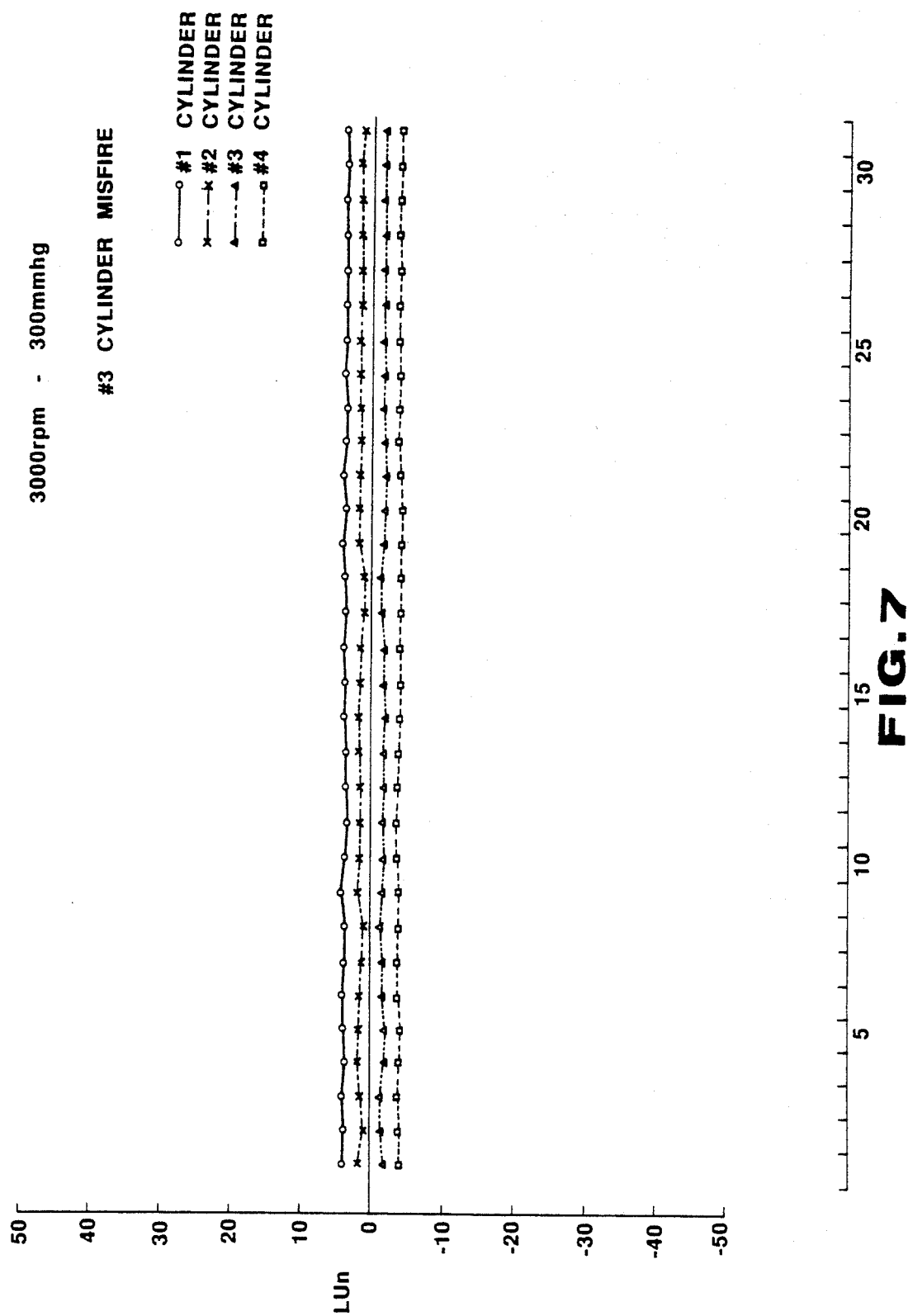

The above equation is obtained by a manner as mentioned in the background of the art and simplified for facilitating calculation based on the revolution cycle T. This equation is essentially the same as that in relation to an LU value as shown in FIG. 5 if "new", "half", and "old" are replaced with T0, T2, and T4 respectively.

The routine then proceeds to step 130 wherein it is determined as to whether the engine roughness value LU is less than zero or not to determine whether the average effective pressure varies to decrease or not. If a YES answer is obtained, that is, the engine roughness value LU is negative, it is concluded that the average effective pressure is reduced and the routine proceeds to step 140.

In step 140, a correction factor "gain" for the value LU is retrieved from a map or table based on an absolute value of a parameter derived by dividing the value LU by a minimum value which is selected from among the old LU values. The table for the correction factor "gain" is such that when a value of |LU/min| is near zero, "1" is assigned to the correction factor and as the value of |LU/min| nears zero, the correction factor suddenly approaches zero. Therefore, when the value LU is multiplied by the correction factor "gain" to adjust the value LU, if the newly calculated value LU is near the minimum value, the value LU is scarcely corrected, however, if the newly calculated value LU is nearer zero than the minimum value, the value LU is compensated so as to be decreased by a relatively great rate. It will be noted that if the value LU is sufficiently nearer zero than the minimum value, the value LU is adjusted to about zero.

As described hereinafter, by comparing the value LU corrected by the correction factor "gain" with a slice level SL, determination is made as to whether the average effective pressure is reduced less than a preselected level for detecting a cylinder in which misfire occurs. However, correction to extremely decrease the value LU by the correction factor "gain" is unable to detect misfire appropriately, additionally, the extremely slight correction to decrease the value LU is unable to avoid mis-detection as is an essential object of the present invention. Therefore, it is preferable to empirically provide the table for the correction factor "gain" based on so-called fuzzy theory.

As described above, according to the correction to adjust the value LU sufficiently nearer zero than the minimum value to about zero with the correction factor "gain", as shown in FIG. 9, the value LU slightly less than the slice level SL when the engine speed varies to create wavering revolution in normal combustion after one misfire occurs discontinuously in a particular cylinder LU is corrected to a value near the slice level SL. Thus, error in misfire detection is prevented.

Additionally, if misfire occurs and the value LU is continuously calculated less than the slice level SL as shown in FIG. 5, the smaller value LU is updated to the minimum value and the other is corrected so as to be slightly decreased by the correction factor "gain" because it is near the minimum value. Thus, it is appreciated that misfire can be detected similar to conventional manner.

After determining the correction factor "gain" based on the value |LU/min| in step 140, the routine proceeds to step 150 wherein the value LU calculated in step 120 is multiplied by the correction factor "gain" and the result is set to a value lu.

The routine proceeds to step 160 wherein it is determined whether the value LU calculated in step 120 is smaller than the minimum value from among the values LU derived until now. If a YES answer is obtained the routine proceeds to step 170 wherein the minimum value is updated.

The routine then proceeds to step 180 wherein it is determined as to whether the value lu corrected in step 150 is smaller than the slice level SL or not. The slice level SL is retrieved from a map or table based on the basic injection quantity Tp and the engine speed N according to a program (executed as a background program) as shown in FIG. 3 and a value intermediate a minimum value LUn when no misfire occurs in all cylinders and a minimum value when misfire occurs in any cylinder is provided to ensure accuracy of the misfire detection relative to variation in the value LUn due to different engine operating conditions. It will be appreciated that the value lu when misfire occurs is less than the slice level SL and thus it is concluded that the average effective pressure is reduced extremely due to misfire.

If a YES answer is obtained in step 180, the routine proceeds to step 200 wherein a timer is reset to zero to measure a period of time elapsed after the misfire detection.

The routine proceeds to step 210 wherein it is determined as to whether a flag is "1" (one) or "0" (zero) in order that when the misfire is continuously monitored, a first value LU is given priority to identify a misfired cylinder. The flag is set to zero in step 190 when the value LU is more than or equal to zero in step 130 and when the value ln is more than or equal to the slice level in step 180. In an initial program cycle when the value lu is less than the slice level SL, the flag is zero and thus the routine proceeds to step 220.

In step 220, a misfired cylinder is specified based on a value Icnt set in a counter to which one of numerical values of 1 to 4 is assigned according to a program as shown by a flowchart in FIG. 4 which corresponds to cylinder numbers 1 to 4 respectively.

The program in FIG. 4 is performed in response to the crank angle reference signals REF output from the crank angle sensor 10 at an angular position 70° before TDC. The crank angle reference signals REF are, for example, pulse signals each having a different width corresponding to each cylinder and indicate reference spark angular positions of the cylinders.

After entering the program in step 500, the routine proceeds to step 510 wherein it is determined which of the cylinders the currently output crank angle reference signal REF corresponds to.

If the currently output crank angle reference signal REF corresponds to #4cylinder, the routine proceeds to step 520 wherein a value Icnt is set to "4". Similarly, in steps 530, 540, and 550, the values Icnt are respectively set to "1", "2", and "3" each corresponding to the cylinder which outputs the crank angle reference signal. The program then terminates in step 560.

Return to FIG. 2b, in step 220 the numerical value indicated by the Icnt is determined to distinguish the current crank angle reference signal REF output from which of the cylinders. It is concluded based on the value lu that misfire (reduction over a preselected rate in the average effective pressure) occurs in a cylinder sparked prior to a cylinder represented by the Icnt because the cylinder sparked before that represented by Icnt produces pressure affecting the current TDC cycle.

Therefore, since in this embodiment the cylinders are ignited in ignition timing order of #1, #3, #4, and #2, it is concluded that for example, if the Icnt indicates "2", misfire has occurred in the #4cylinder. It will be appreciated that according to the numerical value represented by the Icnt, a misfired cylinder is specified.

Subsequently, in steps 230 to 260, "one" is added to a parameter in counters "lstcnt4", "lstcnt3", "lstcnt2", and "lstcnt1" which indicate the number of misfire generated in the cylinders #4, #3, #2, and #1 respectively to update them.

After the number of misfires is set for the corresponding counter(s), the routine proceeds to step 270 wherein the flag is set to "1". Therefore, in the next program cycle, when the routine proceeds to step 210 after determination that the value lu is less than the slice level SL in step 130, it is conceded that the flag is "1". The routine then directly proceeds to step 300 as shown in FIG. 3c without determining a misfired cylinder. As a result, when the values lu less than the slice level SL are continuously calculated, it is concluded that misfire occurs in a cylinder corresponding to the first value. Therefore, for example, when misfire occurs in the #1cylinder successively as shown in FIG. 5 and the values lu (LU) corresponding to the #1 and #3cylinders are less than the slice level SL continuously, it is concluded that the misfire occurs in only #1cylinder.

In step 300, a coefficient X is retrieved from a map or table in relation to a period of time elapsed after conclusion that the value lu is less than the slice level SL. The coefficient X is utilized for correcting the minimum value of the value LU in the next step 310, which may be empirically provided suitably for the engine operating condition.

In step 310, the minimum value is adjusted according to the following relation.

$$min = min (1.0 - X) + SL \cdot X$$

Thus, when the coefficient X is near zero, the minimum value is not corrected, however, as the coefficient X becomes great, the minimum value is converged to the slice level SL gradually. It will be thus noted that long period of time elapsed after the misfire detection causes the minimum value to approach the slice level SL. This adjustment of the minimum value provides further effective control that the value LU is converged to zero in steps 140 and 150. The value LU calculated under wavering of the engine speed caused by the misfire is corrected to a value near zero, thereby preventing misfire from being detected erroneously. Additionally, the adjustment of the minimum value to a value near the slice level SL obtains appropriate minimum value suitable for engine operating condition at that time when the minimum value of the value LU is increased dependent upon variation of the engine operating condition.

Subsequently, the routine proceeds to step 320 wherein "1" (one) is added to a value in a counter which represents the number of program executions every operation after the misfire occurs for measuring a period of time elapsed from the misfire detection (i.e., the number of TDCs).

The routine then proceeds to step 230 wherein it is determined whether the number of executions of program operation "Totalcnt" is less than a preselected number (for example, 1000) or not. If a NO answer is obtained the routine proceeds to step 340 wherein "1" (one) is added to the count value "Totalcnt" and the routine proceeds to step 450 wherein the program terminates. On the other hand, if a YES answer is obtained, the routine proceeds to step 350 the count value "Totalcnt" is reset to zero, after which the routine proceeds to steps 360 to 430 wherein a misfired cylinder number is indicated based on the values representing the numbers of misfire in cylinders respectively. For example, in step 350, it is determined as to whether the value "lstcnt1" representing the number of misfires in the #1cylinder is more than a preselected value until the count value "Totalcnt" reaches "1000". If a YES answer is obtained, the routine proceeds to step 370 wherein the generation of misfire in the #1cylinder is indicated on a display provided on the vehicle dashboard to give alarm to an operator or driver.

Similarly, in steps 360, 380, 400, and 420, the values lstcnt2 to lstcnt4 are compared with the preselected value respectively to determine a generation rate of misfire. If the misfire is generated more than a preselected number of times, the misfired cylinder is displayed to the driver in steps 390, 410, and 430.

Subsequently, the routine then proceeds to step 440 wherein the lstcnt1 to lstcnt 4 are reset to zero respectively for newly setting the number of misfires in each cylinder again during the time the count value "Totalcnt" takes to reach the preselected value.

As mentioned above, while in this embodiment when the number of misfires is more than the preselected number of times, the misfired cylinder is displayed to the driver, fail-safe control such as fuel-cut control may be effected along with the alarm being given to the driver.

Additionally, in the above embodiment, when the value LU is nearer zero than the minimum value, the value LU is corrected by the correction factor "gain" to be set to a value near zero, however, the slice level SL for detecting misfire may be decreased dependent upon a level of the minimum value to prevent the misfire from being erroneously detected based on the value LU which represents reduction in the average effective pressure smaller than the minimum value.

While the present invention has been disclosed in terms of the preferred embodiment in order to facilitate better understanding thereof, it should be appreciated that the invention can be embodied in various ways without departing from the principle thereof. Therefore, the invention should be understood to include all possible embodiments and modifications to shown embodiments which can be embodied without departing from the principle of the invention as set out in the appended claims.

What is claimed is:

1. A system for detecting a misfired cylinder of a multiple cylinder internal combustion engine comprising:

sensor means for monitoring variation of an engine operating condition during each engine revolutional cycle to provide a signal indicative thereof;

first means for determining a first parameter associated with a variation in an average effective pressure of the cylinder based on the variation monitored by said sensor means and providing a signal indicative thereof;

second means responsive to the first parameter determined by said first means less than a preselected level which represents reduction in the average effective pressure in the cylinder to correct the first parameter by a preselected correction factor for compensating a factor of variation of engine revolutional speed after misfire occurs to provide a second parameter; and third means responsive to the second parameter less than a preselected slice level which represents occurrence of misfire for identifying the misfired cylinder.

2. A system as set forth in claim 1, wherein first means further determines a minimum parameter from among the first parameters monitored in previous operational cycles of the system which indicates a maximum reduction in the average effective pressure of the cylinder, the preselected correction factor being determined by a preselected relation between the minimum parameter and the first parameter.

3. A system as set forth in claim 2, wherein said second means compensates the first parameter by a small correction rate as the reduction in the average effective pressure represented by the first parameter becomes nearer the maximum reduction.

4. A system as set forth in claim 2, wherein said first means compensates the minimum parameter to converge with the slice level over a period of time elapsed from the occurrence of the misfire.

5. A system as set forth in claim 1, wherein said sensor means monitors a cycle from the previous top dead center to the current top dead center, said first means determines the first parameter (LU) according to the following relation, $$LU = \frac{(\text{half} - \text{old}) - (\text{new} - \text{half})}{\text{old}}$$

wherein new denotes an up-to-date cycle monitored by said sensor means, half denotes a cycle one stroke cycle before, and old denotes a cycle two stroke cycles before.

6. A system as set forth in claim 1, further comprising display means for displaying the misfired cylinder to an operator when the misfire occurs in a particular cylinder more than a preselected number of times.

7. A system as set forth in claim 1, further comprising a second sensor means for monitoring crank angles of the cylinders to provide signals indicative of top dead centers of the cylinders respectively, said sensor means monitoring revolutional cycles from the top dead center of a previous cylinder to the top dead center of a current cylinder.

8. A system as set forth in claim 1, wherein said slice level is determined by a preselected relation between a fuel injection quantity to the cylinders and an engine speed so that the slice level is defined between a minimum parameter from among the first parameters when misfire occurs and a minimum parameter from among the first parameters when no misfire occurs.

9. A system for detecting a misfired cylinder of a multiple cylinder internal combustion engine comprising:
   sensor means for monitoring a crank angle to determine cycles between top dead centers to provide signals indicative thereof;
   first means for determining a first parameter associated with a variation in an average effective pressure of the cylinder based on the revolutional cycles monitored by said sensor means and providing a signal indicative thereof;
   second means for determining a second parameter selectively, from among the first parameters monitored by said first means in previous operational cycles of the system, which represents a maximum reduction in the average effective pressure;
   third means responsive to the first parameter determined by said first means less than a preselected level which represents reduction in the average effective pressure in the cylinder for compensating the first parameter by a correction factor selected by a relation between the first parameter and the second parameter to provide a third parameter; and
   third means responsive to the third parameter less than a preselected slice level which represents occurrence of misfire for identifying the misfired cylinder.

10. A system as set forth in claim 9, wherein said third means compensates the first parameter by a small reduction rate as an absolute value obtained by dividing the first parameter by the second parameter becomes nearer one.

11. A system as set forth in claim 9, wherein said first means compensates the second parameter to be adjusted toward the slice level as a period of time elapses from the occurrence of the misfire.

12. A system for detecting a misfired cylinder of a multiple cylinder internal combustion engine comprising:
   sensor means for monitoring revolutional cycles of cylinders respectively to provide signals indicative thereof;
   first means for determining a first parameter (LU) associated with a variation in an average effective pressure of the cylinder according to a relation $$LU = \frac{(\text{half} - \text{old}) - (\text{new} - \text{half})}{\text{old}}$$

where new denotes an up-to-date revolutional cycle between top dead centers monitored by said sensor means, half denotes a revolutional cycle between top dead centers one stroke cycle before, and old denotes a revolutional cycle between top dead centers two stroke cycles before, and providing a signal indicative thereof;
   second means for selecting a second parameter, from among the first parameters (LU) monitored by said first means in previous operational cycles of the system, which represents a maximum reduction in the average effective pressure;
   third means responsive to the first parameter (LU) determined by said first means less than a preselected level which represents reduction in the average effective pressure in the cylinder for compensating the first parameter by a correction factor selected by a relation between the first parameter and the second parameter to provide a third parameter; and
   third means responsive to the third parameter less than a preselected slice level which represents occurrence of misfire for identifying the misfired cylinder.

13. A system as set forth in claim 12, wherein said third means compensates the first parameter by a small reduction rate as an absolute value obtained by dividing the first parameter by the second parameter becomes nearer one.

* * * * *

UNITED STATES PATENT AND TRADEMARK OFFICE
CERTIFICATE OF CORRECTION

PATENT NO. : 5,058,551
DATED : Oct. 22, 1991
INVENTOR(S) : Shinpei Nakaniwa It is certified that error appears in the above-identified patent and that said Letters Patent is hereby corrected as shown below:

Title page:

Item [30] should read:

Foreign Application Priority Data

Oct. 24, 1989 [JP]    Japan............1-275046

Signed and Sealed this

Sixth Day of July, 1993

Attest:

MICHAEL K. KIRK

*Attesting Officer*     Acting Commissioner of Patents and Trademarks